UNITED STATES PATENT OFFICE.

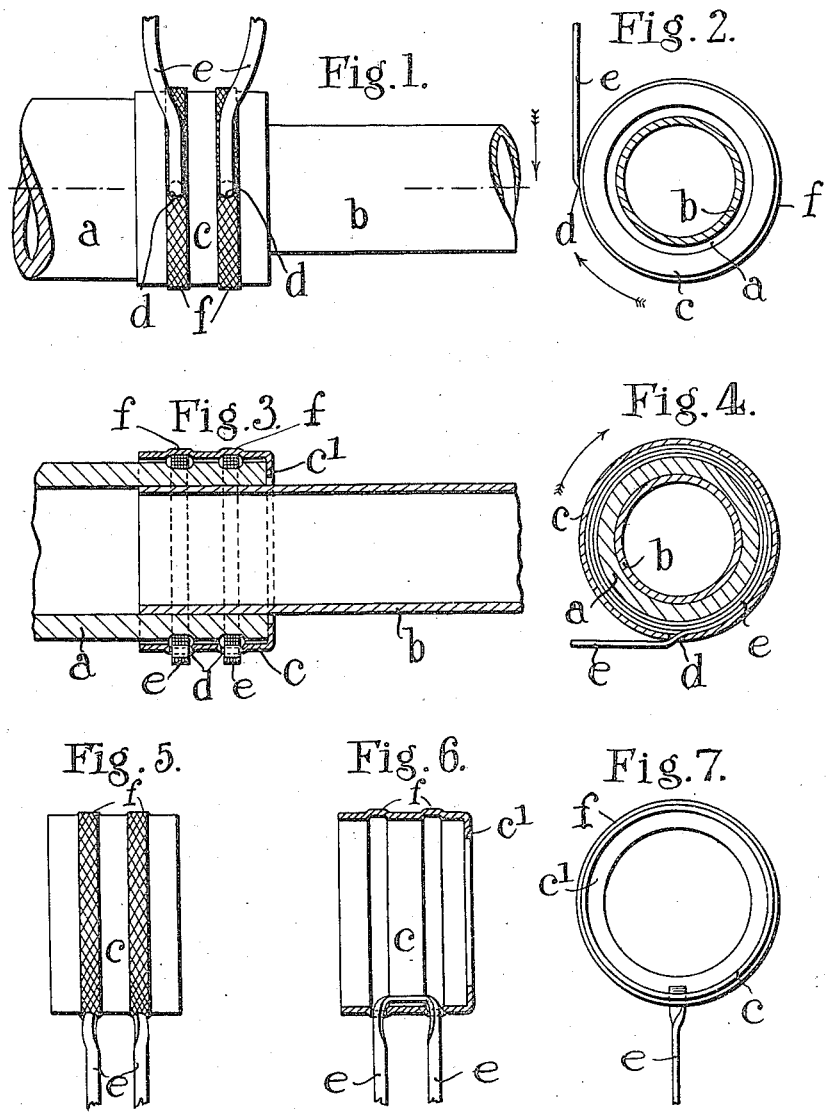

ALBERT HENRY GODFREY GIRLING, OF WOOLWICH, LONDON, ENGLAND.

CLIP OR SOCKET FOR HOSE AND OTHER JOINTS.

1,045,277.

Specification of Letters Patent. Patented Nov. 26, 1912.

Application filed February 1, 1911. Serial No. 605,948.

*To all whom it may concern:*

Be it known that I, ALBERT HENRY GODFREY GIRLING, a subject of the King of Great Britain and Ireland, and residing at 23 Upper Market street, Woolwich, in the county of London, England, have invented certain new and useful Improvements in Clips or Sockets for Hose and other Joints, of which the following is a specification.

This invention relates to a clip or socket for hose and other joints and has for its object to tightly feed in a packing between a thimble or hollow sleeve and a tube or rod therein.

The packing is used to compress or bind an elastic tube onto another tube or rod within it, to make a water or air tight joint, or to firmly secure the thimble onto a rod within whether a water or air tight joint is required or not, for example:—in joining two abutting pipes by a double thimble or sleeve, or for securing a thimble on the end of a rope or a handle on a rod or tube.

This invention consists of a hollow sleeve provided with holes through which is inserted a packing that by relative rotation of the sleeve on the part on which it is placed is fed in between the sleeve and the part.

In the accompanying drawings:—Figures 1 and 2 are side elevation and end view, respectively, of a hose connection constructed according to this invention. Figs. 3 and 4 are longitudinal and cross sections, respectively, of the same. Figs. 5, 6 and 7 are side elevation, longitudinal section and end elevation, respectively, of the thimble or sleeve shown in Figs. 1, 2, 3 and 4.

*a* and *b* represent tubular members arranged concentrically, with a portion of the latter in the former, for coupling purposes. A collar *c*, having an inturned marginal flange *c'*, has formed in its periphery two apertures *d*. Looped through and extending from said apertures, is a relatively flat packing strip *e*, which, when the collar *c* is placed about the tubular member to be coupled, it is adapted to be wound about the tubular member and within the collar *c*. This is accomplished through the loop of the packing *e* buckling or adhering to the tubular member, or members, to be coupled, but "doubling up" and remaining stationary therewith, while the collar *c* is revolved, the packing being gradually fed within the collar.

As clearly shown in Fig. 6 of the drawing, annular external ridges *f* are formed circumferentially about the collar, in spaced relation with respect to each other, to provide interior annular channels, the ridges being milled or knurled to facilitate turning of the collar, the interior annular channels providing means for holding the packing within the collar.

In cases where a joint is required to be made permanent, the packing may be treated with seccotin, fortafix, or the like adhesive. In all cases the thimble or sleeve is made a loose fit with the article over which it is placed. When there is no flange *c'* one or both ends of the thimble may be slightly reduced in diameter to more securely keep the packing to its correct position.

I claim:

1. In a coupling collar, the combination of a cylindrical member, of a collar provided with two external annular ridges spaced apart from each other and respectively forming interior annular channels, the said ridges being milled to facilitate turning of the collar, and said ridges having apertures therethrough, and a relatively flat strip of flexible packing looped through and extending from said apertures and adapted to be wound within said collar and accommodated by the said channels.

2. In a coupling collar, the combination with a cylindrical member, of a collar provided with two external annular ridges spaced apart from each other and respectively forming interior annular channels, the ridges being milled to facilitate turning of the collar, and said ridges having apertures therethrough and flexible packing looped through and extending from said apertures, adapted to be wound within said collar and accommodated by the said channels.

In testimony whereof I have affixed my signature, in presence of two witnesses.

ALBERT HENRY GODFREY GIRLING.

Witnesses:
HARRY JAMES BUCKLAND,
LEONARD S. GIRLING.